May 2, 1961 A. H. KENT 2,982,552

MINIATURE PHONOGRAPH, PARTICULARLY FOR USE IN DOLL BODIES

Filed Nov. 27, 1956 3 Sheets-Sheet 1

INVENTOR.
ALLEN H. KENT

BY Ostrolenk, Faber, Gerb & Soffen
ATTORNEYS

MINIATURE PHONOGRAPH, PARTICULARLY FOR USE IN DOLL BODIES

Filed Nov. 27, 1956

3 Sheets-Sheet 2

INVENTOR.
ALLEN H. KENT

BY Ostrolenk, Faber, Gerb & Soffen

ATTORNEYS

May 2, 1961 A. H. KENT 2,982,552

MINIATURE PHONOGRAPH, PARTICULARLY FOR USE IN DOLL BODIES

Filed Nov. 27, 1956 3 Sheets-Sheet 3

INVENTOR.
ALLEN H. KENT

BY Ostrolenk, Faber, Gerb & Soffen

ATTORNEYS

United States Patent Office 2,982,552
Patented May 2, 1961

2,982,552

MINIATURE PHONOGRAPH, PARTICULARLY FOR USE IN DOLL BODIES

Allen H. Kent, 20 5th Ave., New York, N.Y.

Filed Nov. 27, 1956, Ser. No. 624,525

3 Claims. (Cl. 274—1)

This invention relates to miniature phonographs as used in advertising devices and toys and more particularly to a phonograph specifically devised for use as a portion of a doll body.

In my prior application I show various arrangements and constructions for miniature phonographs of a type having a casing and a cover, each of which members carries coacting elements wherein control of the phonograph is effected by opening and closing the cover. Such prior application is Serial No. 372,995, filed August 7, 1953.

My present invention effects an arrangement wherein the phonograph turntable and motor are carried by the cover and wherein the pick-up arm and the batteries are carried by the main housing of the device.

Among the objects of my invention are to provide a miniature phonograph for use in a doll's body wherein the phonograph housing forms a substantial part of the body and wherein such housing has a portion molded so as to simulate a portion of the body.

Another object of the invention is to provide a simple and rugged construction for a miniature phonograph which will be operable in any position whatsoever in which the body of the doll may be disposed.

Other objects and features of my invention will be apparent from the detailed description which follows.

Briefly, my invention comprises a miniature electrically operated phonograph having a housing in which the batteries and the pick-up arm are disposed and wherein the hinged cover of the housing carries the turntable and a small electric motor. Further, the exterior of the cover is molded so as to simulate a portion of the chest and stomach of a doll into which the housing may be inserted. Thus, with the housing in place in the body of the doll, the cover forms a part of the exterior front surface of the doll. This novel arrangement affords convenient access to the turntable for changing records inasmuch as when the cover is opened, the turntable carried thereon is fully exposed. Further, the arrangement provides for added protection to the pick-up unit which is fully enclosed in the housing at all times, although accessible when the cover is open for change of needle.

A particularly novel feature of the invention comprises mounting the pick-up unit so as to be biased by a spring of sufficient strength to overcome the weight of the pick-up in order that the pick-up may be maintained in engagement with a record at all times regardless of any position in which the doll may be placed. An additionally novel feature of the invention is the provision of a button carried by the cover and coacting with the pick-up in such a way that repeated playing of the record can be readily achieved merely by pressing the button, without resorting to handling any other element of the miniature phonograph.

A detailed description of my invention will now be given in conjunction with the appended drawing in which.

Figures 1, 8:
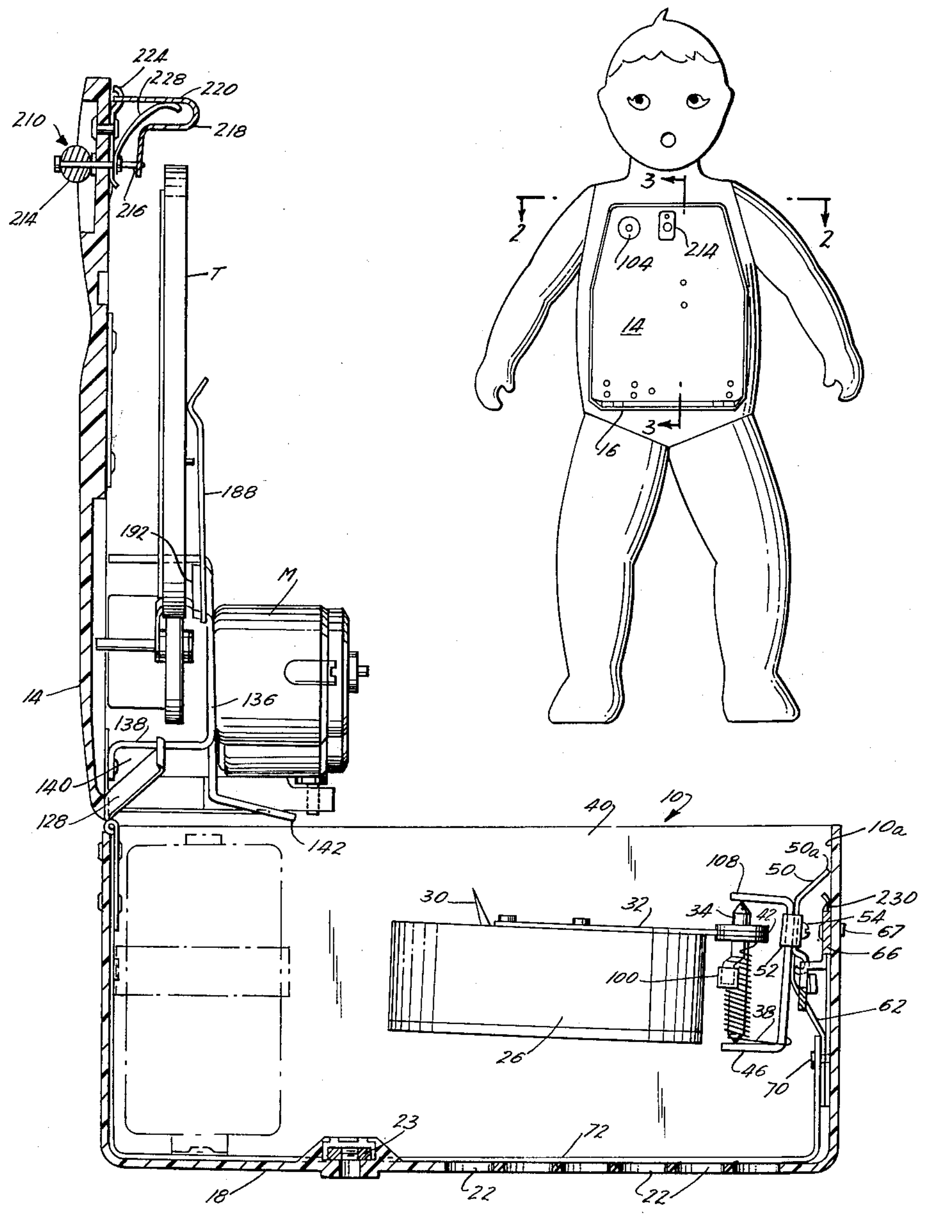
Figure 1 shows diagrammatically a doll with a miniature phonograph of my invention in place and forming a major portion of the torso of the doll.
Figure 8 is a longitudinal elevation in section showing the cover rotated to expose the turntable and reproducer unit.

Referring now to the drawing, my invention comprises a miniature phonograph having a housing 10 and a cover 14 hinged at 16 to the housing. The cover 14 is molded on its exterior so as to simulate the contour of the breast and stomach portion of a doll. As seen in Figure 1, the miniature phonograph occupies a position which takes up almost the whole torso of the doll. The housing 10 is made with a tapering formation at the top to conform to the narrowing of an infant's body toward the shoulders. It will be understood that a doll torso cavity is correspondingly shaped to slidably receive the housing. The housing is preferably made of a flesh-colored plastic.

The rear panel 18 of the housing is provided with suitable apertures such as 22 to permit escape of sound at the back of the doll which, if necessary, may be apertured to permit egress of sound. Embedded in panel 18 may be a nut 22 used for the purpose of fastening the miniature phonograph at the back of the doll in any suitable manner. The housing 10 has a wall **10*a* which carries a phonograph pick-up 26 of a type hereinbefore fully described in my previous patent applications. The pick-up unit 26 may consist of a flat cylindrical pasteboard box which carries a phonograph needle 30 and is suspended on a flexible A-frame 32 in turn carried on a pin 34, which pin is biased as by a spring 38 so that the pick-up 26 tends to move toward the wall 40** of the housing.

Figure 3:
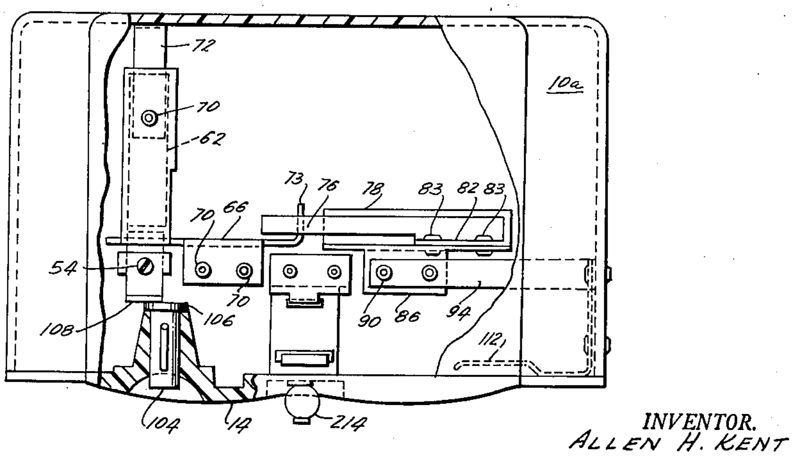
Figure 3 is an elevation in section on the line 3—3 of Figure 1.

It will be noted that as a matter of mechanical expediency either the pin 34 itself may be biased or the apex 42 of the A-frame. In any event, the spring 38 has one end fastened to a bracket 46 which carries the pin in suitably opposed recesses and thus supports the pick-up unit 26. The spring 38 is preferably wound around the pin to the very bottom thereof so that it serves as a supporting sleeve for the pick-up unit. The upper end of the spring may be attached at the apex 42 of the frame (as shown in Figure 3), and such apex may rest on the upper end of the spring.

The bracket 46 (Figures 3, 4, 8) is in turn carried by a pivoted bracket 50, being attached thereto by a strap 52 through which a bolt 54 which passes through the strap and through the bracket 50, being threadedly engaged in the back of the bracket 46. The edge **50*a* (Figure 8) of the bracket 50 serves as a limit stop by abutting the inside surface of the wall 10*a*, such abutment being effected when the cover is open by a leaf spring 62 which bears against the back of the bracket 46 as shown in Figures 3 and 8 to bias the reproducer unit toward turntable T. The bracket element 50 is pivotally carried by an angle member 66 which is integrally fastened to the wall 10*a* by rivets 67. The angle member 66 has a depending leg 68 which serves as a reinforced base to which the spring 62 may be attached as by an eyelet 70. The eyelet 70 passes through an electrical strap-like conductor member 72** and holds such conductor member to the inside of the housing for a purpose to be hereinafter described.

A finger 73 (Figure 4) is formed from the end of the angle element 66, which finger forms part of a normally closed switch in conjunction with a spring leaf contact member 76 carried by an angle plate 78 suitably fastened to the end wall 10*a*. Thus, the spring 76 may have a bent flange portion 82 (Figure 2) at one edge which is fastened by means of eyelets such as 83 to the angle bracket 78. The angle bracket 78 has a flange 86 (Figures 2 and 4) which may be fastened as by suitable eyelets 90 to the end wall 10*a*, there being sandwiched between flange 86 and the end wall a strap-like conductor member 94.

Figures 4, 5, 6, 7:
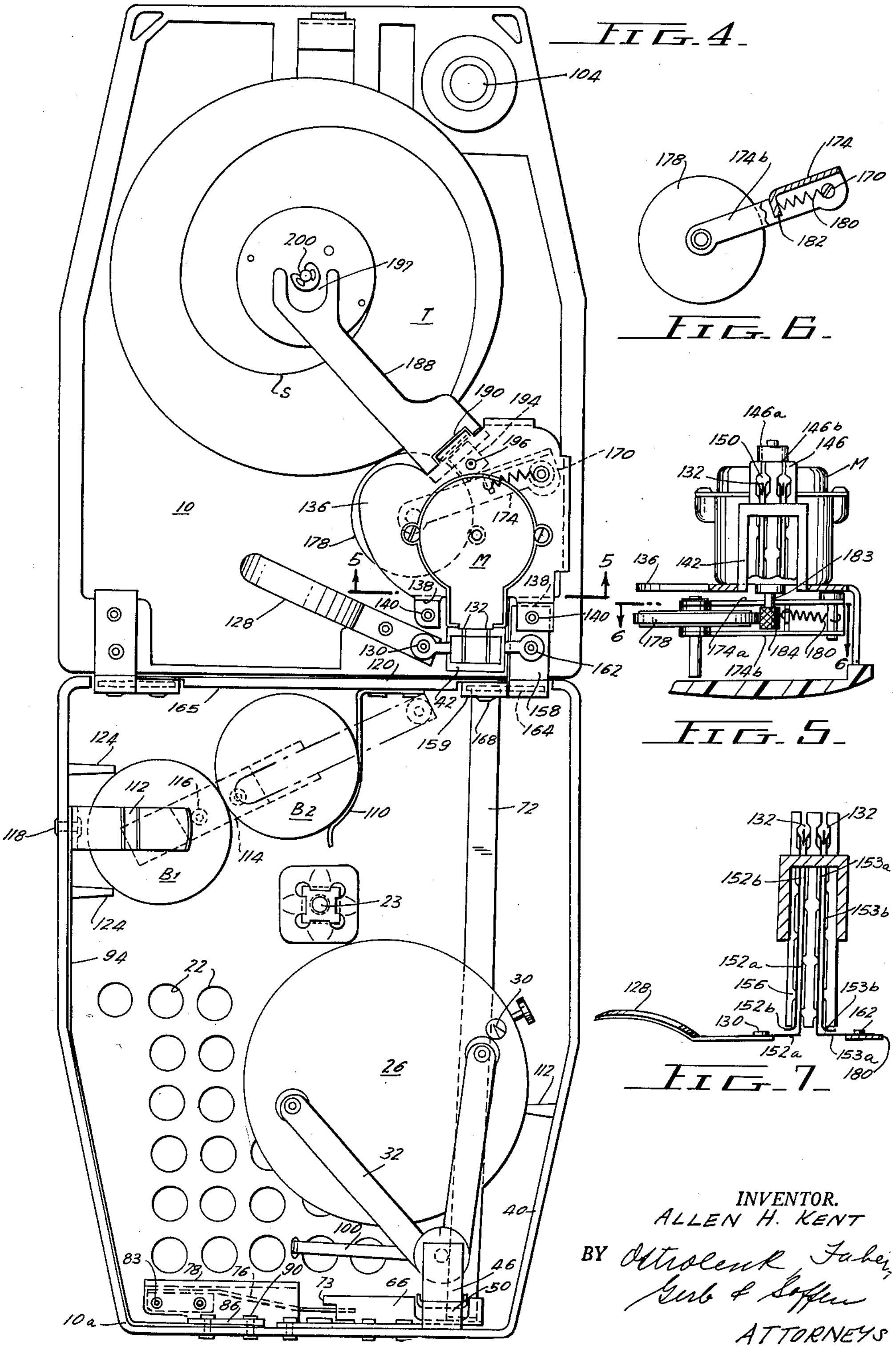
Figure 4 is a fully exposed view of the contents of the housing and cover with the cover swung to fully open position.
Figure 5 is a section through line 5—5 of Figure 4.
Figure 6 is a section through line 6—6 of Figure 5.
Figure 7 is a magnified view of the mode of construction which affords connections from the battery to the motor and constitutes a further novel feature of the invention.

The apex of the A-frame carries a finger 100 which, when the reproducer unit is brought to full counterclockwise position about the pivot of the A-frame, as viewed in Figure 4, toward the center of the turntable, by virtue of the forced needle movement by engagement in the grooves while playing of a record, finger 100 pushes leaf spring contact 76 away from finger 73 to thereby break electrical engagement therebetween. Thus, the conductive paths between the strap-like conductors 72 and 94 are broken.

The mode of operation of this limit switch as just described is substantially the same as heretofore described in my previous patent applications; namely, the spiral groove of the record is engaged by the needle and as the record is played the reproducer unit is swung counterclockwise against the bias of spring 38, as viewed on Figure 4, until ultimately the finger 100 causes deenergization of the motor M by breaking the current path, to be later described, from batteries $B_1$ and $B_2$. If, however, the reproducer unit 26 is moved away from the record so as to disengage the needle from the record groove, the spring 38 then has the effect of swinging the reproducer unit clockwise as viewed on Figure 4 to bring it back to an initial starting position.

Figure 2:
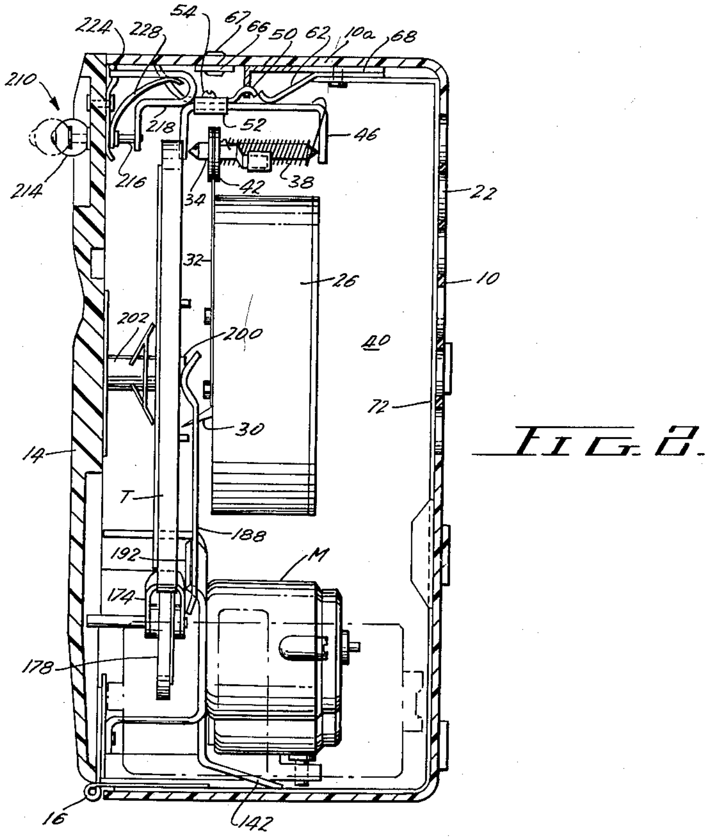
Figure 2 is a plan view partially in section on the line 2—2 of Figure 1.

This is readily accomplished in the present embodiment by providing a button 104 in the cover 14, as seen on Figure 2. The button 104 is smoothly slidable in and carried by the cover. The inner end of the button is flanged at 106 and disposed to engage the upper leg 108 of the bracket 46. Accordingly, it will be apparent that pressing the button will push the bracket 46 down with respect to the view shown in Figure 8. This, of course, removes the needle 30 from any record which may be on the turntable T and frees the reproducer unit so that it may be swung by means of the torsion of spring 38 back to a limiting position determined by the engagement of the side of the reproducer unit with a rib 112 that may be molded as part of the wall of the housing as shown in Figure 4.

As disclosed in my previous applications, the turntable T may be provided with a spiral groove S so that when there is no record on the turntable the needle will automatically be guided by the groove to the inner limiting position at which point the arm 100 engages the leaf spring contact element 76 to break engagement with the finger 73 as will be readily apparent from consideration of Figure 4 whereby the motor M is de-energized.

Also carried within the housing 10 (Figure 4) are clips such as 110 and 112 for securing the batteries $B_1$ and $B_2$. The batteries are disposed, conventionally, with a negative of one battery and positive of the other battery at the top so that they may be connected in series by virtue of a spring contact 114 fastened to the back of the housing as by eyelets 116. The clips may be suitably fastened to walls of the housing by eyelets such as 118 and 120, and the housing is preferably provided with a pair of molded ribs 124 for the purpose of securely holding one of the batteries, e.g. $B_1$, in fixed position by virtue of engaging the sides thereof. This has the effect of suitably positioning both batteries in the housing because of the side pressure afforded by the clip 110 against the battery $B_2$ which presses against $B_1$. The conductive strap 94 is fastened to the clip 112 in an electrically conductive manner as by being sandwiched between that clip and the housing wall and rigidly secured by the previously mentioned eyelet 118. Thus, the clip 112 is juxtaposed above the battery $B_1$ so that it can bear downwardly on the positive terminal thereof. On the other hand, the negative terminal of that battery, being in engagement with one end of the contact strip 114 is connected thereby to the positive terminal of the inverted battery $B_2$. A resilient contact leaf 128 is carried in suitably fixed position by eyelet 130 on the housing cover 10, and it will be understood that when the cover is closed the leaf 128 comes into conductive engagement with the negative end of the battery $B_2$ as indicated by phantom lines.

The motor M is also carried by the cover and the motor lugs 132 are connected to the flexible conductive strip 128 and also to the conductive strap 72, as hereinafter described.

The motor is mounted on cover 14 by means of a stand 136, as shown in Figure 8, the motor being suitably secured to the stand. The stand 136 has a pair of legs such as 138 which are spaced apart and which are held to the cover 14 as by eyelets 140. See Figures 4 and 8. An integral part of the motor mounting stand 136 is a closed loop or strap 142 which extends from the main plate of the stand in a direction opposite to that in which the legs 138 extend. The strap 142 has an opening which encompasses, as shown in Figure 5, a plastic block 146 that is provided with slits 146*a* and and 146*b*. The upper ends of these slits are provided with enlarged recesses such as 150 into which the motor lugs 132 protrude. The motor lugs protrude between metallic flexible contact strips such as the strips 152*a* and 152*b* and 153*a* and 153*b* which are disposed in the slits 146*a* and 146*b* and which strips extend throughout the length of the slits. The contact strips are in compressed engagement with each other by virtue of protuberances such as 156 which are part of the molded construction of the strip 146 and which extend into respective slits 146*a* and 146*b* as shown on Figure 7. Thus, each slit has such protuberances 156 protruding thereinto from both sides to press against the metallic contact strips. The outer strips 152*b* and 153*b* are bent upwardly at their lower ends as shown in Figure 7 so as to be maintained within their respective slits 146*a* and 146*b*. However, the inner strips 152 and 153*a* are bent outwardly and extended so as to be electrically connected to conduct current from the batteries to the motor. Thus, as shown in Figure 7, the strip 152*a* is fastened to the conductive strap 128 by the eyelet 130 which holds the flexible strip 128 to the cover. The strip 153*a* is fastened to a small metallic plate 158 by an eyelet 162 which secures the plate to the cover. One end of the plate 158 is fastened intermediate the leg 138 and the cover by the eyelet 140 (Figure 4), while the other end of the plate 158 is formed into a strap and has a metallic pin 164 passing thereinto to form a pintle with another metallic strap 168 which is fastened to the end wall 165 of the housing by a unit 166 which serves to hold strap 168 integral with the conductor 72. Thus, elements 158—164—168 form a hinge for the cover 14, and current may run from the conductor 72 through the hinge and thence to the contact strip 153*a*.

From the foregoing description, it will be seen that electrical current may pass from the negative end of battery $B_2$ which is engaged by the resilient leaf 128 to the conductor element 152*a*, thence to a motor terminal 132, through the motor, thence from the other motor terminal 132 and the conductor strip 153*a*, thence to the hinge element 158, pintle 164, hinge element 159, strap 72, angle element 66, finger 73, flexible leaf spring 76, angle element 78, strap-like conductor 94, clip 112 to the positive terminal of battery $B_1$. It will, of course, be appreciated that angle members 66 and 78 are electrically isolated from each other.

As heretofore mentioned, when the cover is open the contact spring 128 is removed from contact with the terminal of battery $B_2$ and thus the motor is de-energized. Also, at the end of play of a record, finger 100 opens the contact engagement between contact spring 76 and 63 to deenergize the motor.

The drive for the motor is substantially the same as that heretofore described in one of my previous patent applications. Thus, the motor mount carries a pin 170 to which is fastened an arm 174, the outer end of which carries an idler 178. A spring 180 has one end secured at the pin 170 and the other end secured at a bent-over flange 182 of the arm 174. The motor pulley 184 is maintained in engagement with the idler 178 by means of the spring 180. The idler 178 is carried between extended parallel arms **174*a* and 174*b* of the arm 174**.

By virtue of the biasing effect of the spring 180, the idler 178 is maintained in simultaneous engagement with pulley 184 and also with the rims of the turntable T.

Inasmuch as the doll in which the miniature phonograph is installed may be placed in a variety of positions, it is necessary to provide suitable means for ensuring retention of a record on the turntable at all times. I provide this in a novel manner (Figure 4) by means of an arm 188 suitably hinged to the motor mount. The arm has an end slot 190 through which slot a hook 192 formed of the plate material of the motor mount 136 passes. A spring leaf 194, fastened at one end to the motor mount by an eyelet 196, has a cantilever end bearing against the edge of the arm 188. Thus, the arm may be maintained in perpendicular position away from the turntable or in spring biased position against the turntable (Figure 8) so as to maintain a record thereagainst. A notch 197 is provided at the free end of arm 188 to straddle the protruding end of shaft 200 which carries the turntable T on a suitable bearing 202 secured to the housing.

A latch device 210 is provided to maintain the cover closed. As seen in Figure 8, the latch consists of a ball handle 214 secured to a pin 216 to which is fastened a bent metal strap 218 having a slot 220. One end of the strap 218 is pivotally carried by a clip 224 fastened to the cover. A leaf spring 228 maintains strap 218 in the position shown so that when the cover is closed, a hook member 230 carried by wall **10*a* resiliently engages in slot 220. When ball 214 is pulled away from the cover strap 218 is rocked to disengage hook 230 from slot 220**.

In the foregoing the invention has been described solely in connection with specific illustrative embodiments thereof. Since many variations and modifications of the invention will now be obvious to those skilled in the art, I prefer to be bound not by the specific disclosures herein contained but only by the appended claims.

I claim:

1. A phonograph comprising a housing, a battery compartment in said housing, said battery compartment comprising a pair of angularly related walls of said housing, and means for retaining a pair of tangentially engaged batteries intermediate said walls comprising a single resilient clip carried by one wall for engaging one battery, and rib means protruding from the other of said walls and formed integrally therewith to engage the other battery, whereby said batteries are maintained in position by pressure of said clip means.

2. A phonograph comprising a housing and having a cover hinged thereto, a pick-up unit pivotally mounted in said housing and having a needle protruding therefrom towards said cover, a biasing spring, said pick-up unit being biased toward said cover by said spring, said spring being of sufficient strength to overcome the weight of said pick-up unit in any position of said housing, a turntable carried by said cover, said needle being in engagement therewith by virtue of the biasing force of said spring when said cover is closed; said biasing spring also urging said needle toward the periphery of said turntable in the closed position of said cover when said needle is moved away from said periphery toward the center of said turntable; a manually depressible element carried by said cover disposed to effect movement of said pick-up unit away from said turntable when depressed against the force of said biasing spring, said biasing spring being effective to move said needle toward the periphery of said turntable when said element is depressed and the cover is closed; a battery powered motor carried by said cover for driving said turntable and means for holding a battery in a predetermined position within said housing, a conductive contact element carried by said cover disposed to register for conductive contact with a battery held in said holding means when said cover is closed and to open contact when said cover is open, including conductive means for completing a circuit from said battery to said motor through said contact element.

3. A phonograph comprising a housing, a pick-up unit including a needle carried thereby disposed in said housing, a battery compartment in said housing, a cover hinged to said housing, a motor and a turntable carried by said cover, said needle engaging said turntable when said cover is closed, including electrical conductor means intermediate said battery compartment and said motor operative to conduct current when said cover is closed, and means engageable by said pick-up to interrupt said conductor means when said needle has reached a predetermined point between the periphery and center of said turntable; said electrical conductor means comprising a conductive terminal protruding from said motor, a block of insulating material secured relative to said motor and having a slit into which said terminal protrudes, a conductive strip in said slit engaging said terminal in said slit and extending the length of said slit and having an end extending beyond an end of said block.

References Cited in the file of this patent

UNITED STATES PATENTS

| | | |
|---|---|---|
| 605,192 | Sivan | June 7, 1898 |
| 813,005 | Hult | Feb. 20, 1906 |
| 2,063,578 | Berglund | Dec. 8, 1936 |
| 2,216,635 | Tate et al. | Oct. 1, 1940 |
| 2,228,931 | Rysick | Jan. 14, 1941 |
| 2,481,686 | Roggenstein | Sept. 13, 1949 |
| 2,552,757 | Adler et al. | May 15, 1951 |
| 2,556,421 | Gee | June 12, 1951 |
| 2,622,883 | Kurzen | Dec. 23, 1952 |
| 2,633,667 | Brown et al. | Apr. 7, 1953 |
| 2,776,837 | Mueller | Jan. 8, 1957 |

FOREIGN PATENTS

| | | |
|---|---|---|
| 725,755 | Great Britain | Mar. 9, 1955 |